United States Patent [19]

Adlhart et al.

[11] Patent Number: 5,047,301
[45] Date of Patent: Sep. 10, 1991

[54] HIGH TEMPERATURE BATTERY AND SYSTEM UTILIZING SAME

[75] Inventors: Otto J. Adlhart, Fair Lawn; Timothy D. Meyer, Wyckoff, both of N.J.

[73] Assignee: Ergenics Power Systems, Inc., Ringwood, N.J.

[21] Appl. No.: 622,216

[22] Filed: Dec. 3, 1990

Related U.S. Application Data

[63] Continuation of Ser. No. 332,463, Mar. 31, 1989, abandoned.

[51] Int. Cl.[5] .................... H01M 12/04; H01M 6/30
[52] U.S. Cl. .................................. 429/101; 429/110
[58] Field of Search ............ 429/101, 110, 152, 153, 429/154, 128, 206, 40

[56] References Cited

U.S. PATENT DOCUMENTS

| | | | |
|---|---|---|---|
| 3,959,018 | 5/1976 | Dunlop et al. | 429/206 |
| 4,115,630 | 9/1978 | Ommering et al. | 429/101 |
| 4,395,469 | 7/1983 | Fritts | 429/101 |
| 4,467,020 | 8/1984 | Puglisi | 429/101 |
| 4,721,660 | 1/1988 | Kujas | 429/40 |

*Primary Examiner*—Donald L. Walton
*Attorney, Agent, or Firm*—Kinzer, Plyer, Dorn, McEachran & Jambor

[57] ABSTRACT

A battery capable of extended operation at high temperature includes a cell of laminated construction utilizing a solid oxidant cathode, an electrolyte element, a catalyst and a gas impermeable separator sheet providing an anode for the cell, with each element in electrical connection with the next. The solid oxidant is a mixture including powdered manganese dioxide, carbon and caustic material, the electrolyte element is a mixture including powdered magnesium oxide, and a binder, pressed into a solid pellet and soaked with caustic material. The cell further has a porous carbon paper substrate in electrical contact with the gas impermeable separator sheet and the catalyst is platinum dispersed on and adhered to the substrate. A source of hydrogen gas is provided, and when the battery is exposed to the hydrogen gas, a voltage is generated.

10 Claims, 2 Drawing Sheets

HIGH TEMPERATURE BATTERY AND SYSTEM UTILIZING SAME

This is a continuation of copending application Ser. No. 07/332,463 filed on Mar. 31, 1989 now abandoned.

BACKGROUND OF THE INVENTION

This invention relates to batteries and more particularly to a battery which contains a solid cathodic material and a gaseous anodic reactant, including hydrogen. The battery is capable of extended operation over a wide temperature range, such as from 0° C. to 200° C.

A battery constructed and operated as herein disclosed is suitable for providing electrical power in hot environments up to 200° C., whereas conventional primary and secondary batteries are limited to operation at temperatures less than 120° C. Such conventional batteries use anodic materials such as lithium or lithium alloys, cadmium or zinc which are not suitable for applications requiring high temperature operation, since they tend at high temperatures to react chemically in an uncontrolled way, instead of electrochemically generating electric power.

In contrast, the present invention presents a battery that can be made to generate electric power at temperatures up to 200° C. for extended periods of time.

A battery embodying the invention is of simple, solid, robust and relatively inexpensive construction and is reliable in operation.

Furthermore, because of its construction, a battery embodying the invention lends itself to high vibration services as well as to high temperature applications.

Accordingly, it is an important object of the invention to provide a battery capable of extended operation over a wide temperature application, such as from 0° C. to 200° C.

It is another object of the invention to provide such a battery containing materials that will generate electric power at temperatures of up to 200° C. for extended periods of time.

It is yet another object of the invention to provide such a battery which is simple and reliable in operation.

The foregoing and other objects and advantages will become apparent hereinafter.

SUMMARY OF THE INVENTION

A battery embodying the invention, because of the materials used and the manner of its assembly, enables extended operation at elevated temperatures. The battery relies on a gaseous anodic reactant which is converted on a catlyzed electrode and solid oxidant which is provided in the form of a pressed pellet of powdered manganese dioxide ($MnO_2$) mixed with powdered graphite and caustic solution (KOH).

The inventive battery includes at least one cell of laminated construction. The cell comprises a solid oxidant cathode, an electrolyte element in electrical contact with the cathode, a catalyst in electrical contact with the electrolyte element, and an electrically conductive hydrophobic gas distribution sheet in electrical contact with the catalyst and providing the anode of the cell and an electrolyte impermeable separation sheet dividing individual cells.

The solid oxidant is a mixture including powdered manganese dioxide ($MnO_2$), and caustic material, for instance potassium hydroxide (KOH), pressed into a pellet.

The electrolyte element is a mixture including powdered magnesium oxide (MgO), and a tetrafluoroethylene binder, pressed into a pellet and soaked with caustic material, for instance potassium hydroxide (KOH).

The catalyst may be applied directly to the electrolyte element or be supported on the gas surface of the gas distribution sheet facing the electrolyte.

Furthermore, the catalyst may be supported on a hydrophobic porous carbon paper substrate such as used in fuel cells and dispersed and adhered to the paper to present a high surface area. This electrode member is then placed between the hydrophobic gas distribution sheet and the electrolyte.

The battery may be an assembly including a plurality of such cells stacked in series one on top of the other, so that each cell is in engagement with at least one other cell. Each such engagement is between the cathode of one cell and the electrolyte impermeable separator sheet of an adjacent cell. The stack includes first and second endmost cells, the first of which has its cathode not in engagement with the electrolyte impermeable separator sheet of an adjacent cell and the second of which has its gas impermeable separator sheet not in engagement with the cathode of an adjacent cell.

The multi-cell assembly further comprises a negative end terminating with an electrically conductive separator sheet in electrical contact with the cathode of the first endmost cell. A current collector engages the separator sheet, a first silicone rubber insulator is in engagement with the first current collector, and a first end plate is in engagement with the first silicone rubber insulator. The assembly additionally comprises a positive end terminating with a second current collector in electrical contact with the electrolyte impermeable separator sheet of the second endmost cell. A second silicone rubber insulator is in engagement with the second current collector, and a second end plate is in engagement with the second rubber insulator. The current collectors provide means for using power generated by the battery. The assembly has a hole therethrough. An insulated bolt passes through the hole and a nut threadedly engages the bolt and cooperates therewith to clamp the assembly together.

The inventive battery is a part of a battery system, being contained in a first vessel. The system further comprises a second vessel in the form of a metal hydride container containing a metal hydride bed, and piping connects the vessels so that the battery can be exposed to hydrogen gas, to generate a voltage in each cell by consuming the hydrogen gas and the solid oxidant thereof.

DESCRIPTION OF THE INVENTION

Figure 1:
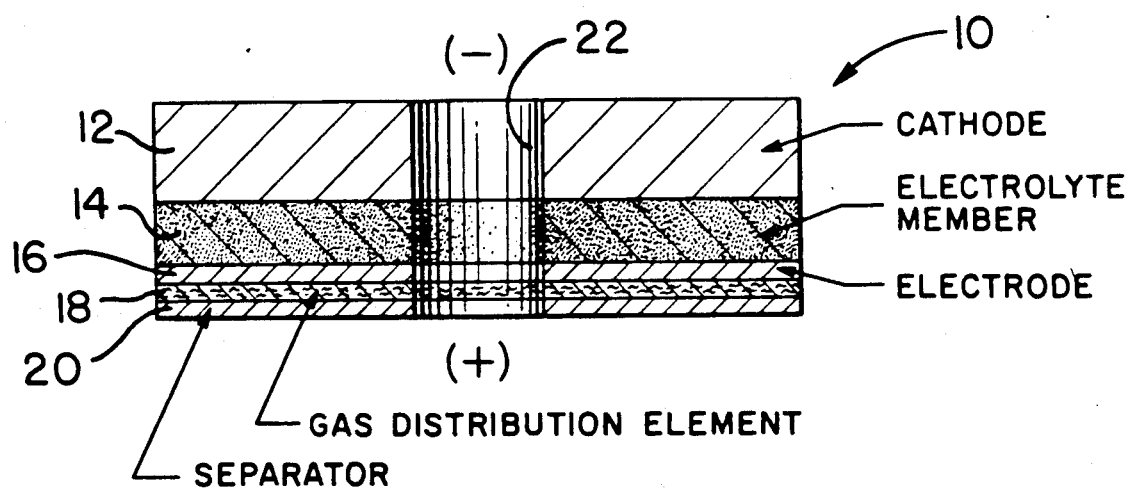
FIG. 1 is a somewhat schematic longitudinal sectional view of a battery which is a single cell preferred embodiment of the invention.

The invention will be described initially with reference to FIG. 1 which shows in longitudinal section a battery which is a single cell 10 of laminated construction including a solid oxidant cathode 12 which is provided by a mixture of powdered manganese dioxide ($MnO_2$), powdered graphite and caustic material, such as potassium hydroxide (KOH), pressed into a solid pellet. An electrolyte element 14, which is in electrical contact with cathode 12, is provided by a mixture of powdered magnesium oxide (MgO), a binder of tetrafluoroethylene pressed into a solid pellet soaked with caustic material such as potassium hydroxide (KOH). A catalyzed carbon paper substrate 16 is in contact with element 14 and a hydrophobic porous carbon gas dispersing plate 18. Platinum catalyst may be applied for activation to substrate 16 as described in U.S. Pat. No. 4,175,165 or by other known methods which provide reliable adherence to the carbon paper substrate. Cell 10 includes an electrically conductive separator sheet 20 which may be made of metal or graphite. Separator sheet 20, which is in electrical contact with dispersing plate 18, is the last element of cell 10. Cell 10 further has an axial hole 22 therethrough.

Figure 2:
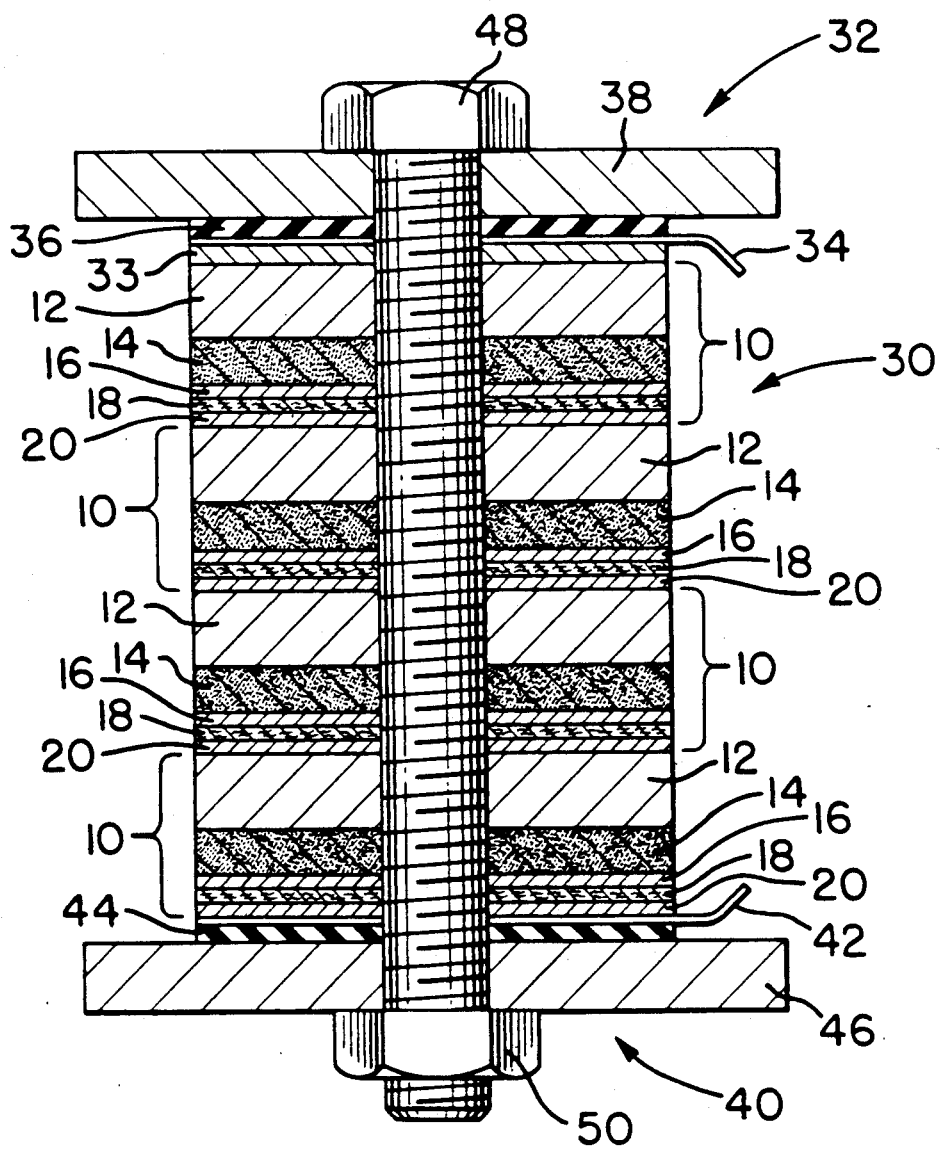
FIG. 2 is a longitudinal sectional view of a battery which is made up of a plurality of cells each of which is as shown in FIG. 1.

FIG. 2 is a longitudinal sectional view of a battery 30 which is made up of a plurality of cells 10, stacked in series one on top of the other, to build up a desired voltage. As shown, battery 30 includes four cells 10, but this number of cells could be more or less to suit requirements. Battery 30 has a negative end 32 terminating with an electrically conductive separator sheet 33 which may be made of metal or pressed graphite and which may be the same as separator sheet 20, sheet 33 being in electrical contact with cathode 12 of an endmost cell 10, a nickel (Ni) foil current collector 34 in electrical contact with sheet 33, a silicone rubber insulator 36 in engagement with collector 34, and an end plate 38 in engagement with insulator 36. Similarly, battery 30 has a positive end 40 terminating with a nickel (Ni) foil current collector 42 in electrical contact with separator sheet 20 of the other endmost cell 10, a silicone rubber insulator 44 in engagement with sheet 20 and an end plate 46 in engagement with insulator 44. An insulated bolt 48 passes through aligned axial hole 22 through stacked cells 10, and unnumbered holes through sheet 33, current collectors 34 and 42, insulators 36 and 44 and end plates 38 and 46. A nut 50 threadedly engages bolt 48 and is turned thereon to clamp the elements of battery 30 together to provide structural stability and to maintain firm, low resistance electrical conductivity between the elements of battery 30. Cells 10 are oriented so that all cathodes 12 face in the same direction and every cathode 12 but one engages separator sheet 20 of an adjacent cell 10.

Figure 3:
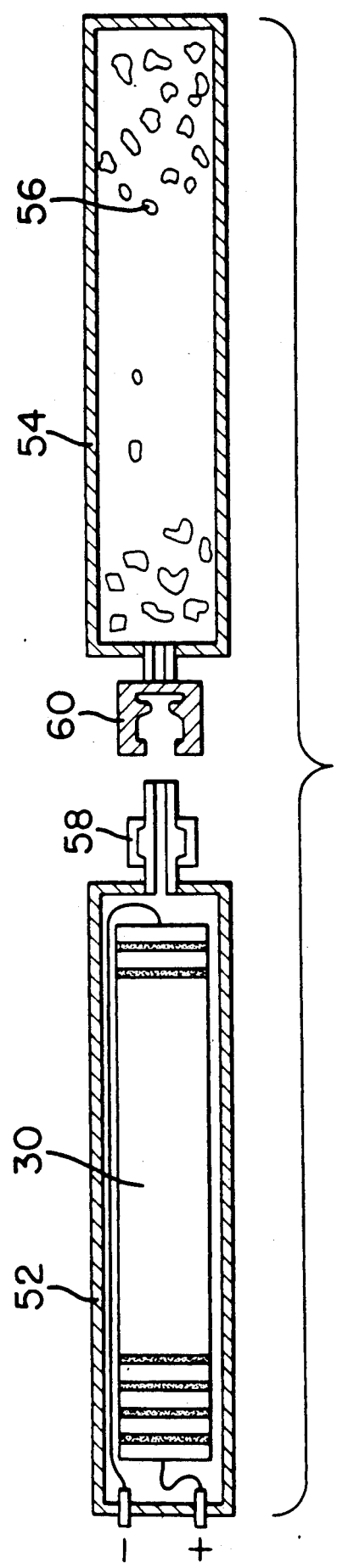
FIG. 3 is a schematic view showing a system including a battery embodying the invention connected to a supply of hydrogen fuel.

FIG. 3 shows a first vessel 52 which contains battery 30 and a second vessel in the form of a metal hydride container 54 which contains a metal hydride bed 56. Piping 58 connects vessels 52 and 54, so that battery 30 can be exposed to hydrogen gas.

When battery 30 is exposed to hydrogen gas, a voltage is generated in each cell 10 thereof. As stated above, because cells 10 are series connected, the generated voltage is additive and the generated power may be used by making suitable connections to current collectors 34 and 42. The hydrogen gas battery 30 begins to generate power by gradually consuming the solid oxidant of cathode 12 of each cell 10. The electrochemical reaction with the hydrogen fuel generates electricity and water similar to the way in which a fuel cell utilizes gaseous reactants.

No reactants are consumed until vessels 52 and 54 are connected. Therefore, the shelf life of the system is extremely long, up to several years or more. Even after vessels 52 and 54 are connected, shelf life is on the order of months when in the open circuit condition. Operation at 175° C. has been demonstrated for runs up to 150 hours, and useful power has been demonstrated at room temperature. The elements of cells 10 are replaceable and hydride bed 56 is readily rechargeable.

It is apparent that the invention achieves the above-stated objects and advantages and others.

The disclosed details are exemplary only and are not to be taken as limitations on the invention except as those details may be included in the appended claims.

What is claimed is:

1. An energizing system organizable in a cylindrical configuration, for use at a temperature in a range from 0° to +200° C. and under severe vibrational conditions, the system comprising in combination:

a first cylindrical vessel containing a battery which includes a cell of laminated construction comprising a solid oxidant cathode, an electrolyte element in electrical contact with said cathode, a catalyst in electrical contact with said electrolyte element, and an electrically conductive electrolyte impermeable separator sheet in electrical contact with said catalyst and providing an anode for said cell;

a second cylindrical vessel in the form of a metal container provided with a metal hydride bed in which hydrogen is reversible stored;

and piping means connecting said first vessel to said second vessel so that battery can be exposed to hydrogen gas to generate a voltage by consuming said hydrogen and solid oxidant thereof.

2. A high temperature battery system usable in a high-vibrational environment, comprising a) a first chamber including a battery, said battery including at least one cell, each said at least one cell including a solid oxidant cathode, an electrolyte material in electrical contact with said cathode, a catalyst means in electrical contact with said electrolyte material and an anode having an electrically conductive separator element in electrical contact with said catalyst, said separator element being substantially impermeable to penetration by said electrolyte material;

b) a second chamber in fluid communication with said first chamber, said second chamber including a bed of a metal hydride material in which elemental hydrogen is reversible stored and from which hydrogen gas may be discharged; and c) piping means attached to each of said first and second chambers providing fluid communication of hydrogen gas, which is discharged from said metal hydride material, to said first chamber, said piping means including a connection means to connect to each other the piping means attached to each chamber in fluid communication when a voltage is required, whereby selective connection of said connection means provides said hydrogen gas to said first chamber causing a desired voltage in said at least one cell due to the electrochemical reaction of said hydrogen gas with the elements of each cell.

3. A battery system according to claim 2 wherein said solid oxidant cathode comprises a pressed mixture including powdered manganese dioxide and powdered graphite and a caustic material.

4. A battery system according to claim 3 wherein said caustic material is potassium hydroxide.

5. A battery according to claim 2 wherein said electrolyte material comprises a pressed mixture including powdered magnesium oxide and a binder of tetrafluoroethylene soaked with a caustic material.

6. A battery system according to claim 5 wherein said caustic material is potassium hydroxide.

7. A battery system according to claim 2 further comprising a porous carbon paper substrate in electrical contact with said separator element, and wherein said catalyst is platinum dispersed on and adhered to said porous carbon paper substrate to present a high surface area, the electrical contact between said separator element and said catalyst being indirect, through a hydrophobic porous carbon plate.

8. A battery system according to claim 2 further comprising an assembly including a plurality of cells, said cells being stacked in series one on top of the other, and including a first endmost cell and a second endmost cell, each said cell being in engagement with at least one other of said cells, each said engagement being between said cathode of one said cell and said separator element of an adjacent said cell, said first endmost cell having its said cathode not in engagement with said separator sheet of an adjacent said cell and said second endmost cell having its said gas impermeable separator sheet not in engagement with said cathode of an adjacent said cell.

9. A battery system according to claim 8 wherein said assembly further comprises a negative end termination with a first nickel foil current collector in electrical contact with an electrically conductive separator sheet which is in electrical contact with said cathode of said first endmost cell, a first silicone rubber insulator and a first end plate, and a positive end terminating with a second nickel foil current collector in electrical contact with said separator sheet of said second endmost cell, a second silicone rubber insulator and a second end plate, said current collectors providing means for using power generated by said battery.

10. A battery system according to claim 9 wherein said assembly is provided with a hole therethrough and said battery further comprises an insulated bolt passing through said hole and a nut threadedly engaging said bolt, said bolt and said nut cooperating to clamp said assembly together.

* * * * *